FIG-2

Sept. 27, 1966 R. S. BAKER 3,274,659
APPARATUS FOR FORMING CONCRETE ARTICLES
Filed June 10, 1965 10 Sheets-Sheet 6

Sept. 27, 1966 R. S. BAKER 3,274,659
APPARATUS FOR FORMING CONCRETE ARTICLES
Filed June 10, 1965 10 Sheets-Sheet 10

INVENTOR
ROBERT S. BAKER
BY Mason, Fenwick & Lawrence
ATTORNEYS

United States Patent Office 3,274,659
Patented Sept. 27, 1966

3,274,659
APPARATUS FOR FORMING CONCRETE
ARTICLES
Robert S. Baker, P.O. Box 11615, Tampa, Fla.
Filed June 10, 1965, Ser. No. 462,904
7 Claims. (Cl. 25—2)

This invention relates to apparatus for casting concrete articles, and particularly to such apparatus which has automatic or semi-automatic powered operation.

In two previous machines, disclosed in Patent. No. 3,128,521 issued April 14, 1964, and co-pending application S.N. 344,095 filed February 11, 1964, apparatus has been provided for making prestressed concrete articles automatically by advancing portacle pallets along a path, stringing cables between the pallet headers, stressing the cables, pouring the concrete, tamping and vibrating the concrete to settle it, and removing the pallet with its cast member from the machine. This apparatus is highly satisfactory, but it requires a larger area for installation, a considerable original investment, and high volume production to make it economically feasible. While it is excellent for a central plant, it is desirable to have less elaborate equipment for use in local plants close to points of distribution of the product.

The general object of the present invention is to provide simplified apparatus for forming concrete members on pallets advancing along a pallet path.

A more specific object is to provide such apparatus having means to ensure the deposit of equal quantities of concrete in each pallet to produce a predetermined product.

Another object of the invention is to provide apparatus of this nature wherein automatic mechanism will cause even distribution of the concrete throughout the pallet length to achieve a concrete member of proper shape with uniform density throughout.

A further object is the provision of novel means for assuring correct alignment of pallets at the time of arrival at the molding position to enable proper registration of the mold box with the pallets.

Other objects of the invention will become apparent from the following description of one practical embodiment thereof, when taken in conjunction with the drawings which accompany, and form part of, this specification.

In general, the apparatus forming the subject matter of this application consists in means forming a pallet path leading to and from a molding station where a mold box is associated with pallets moved automatically along the path, and means for depositing a predetermined amount of concrete into the mold box and pallet, with the concrete uniformly distributed along the pallet length.

Figure 1:
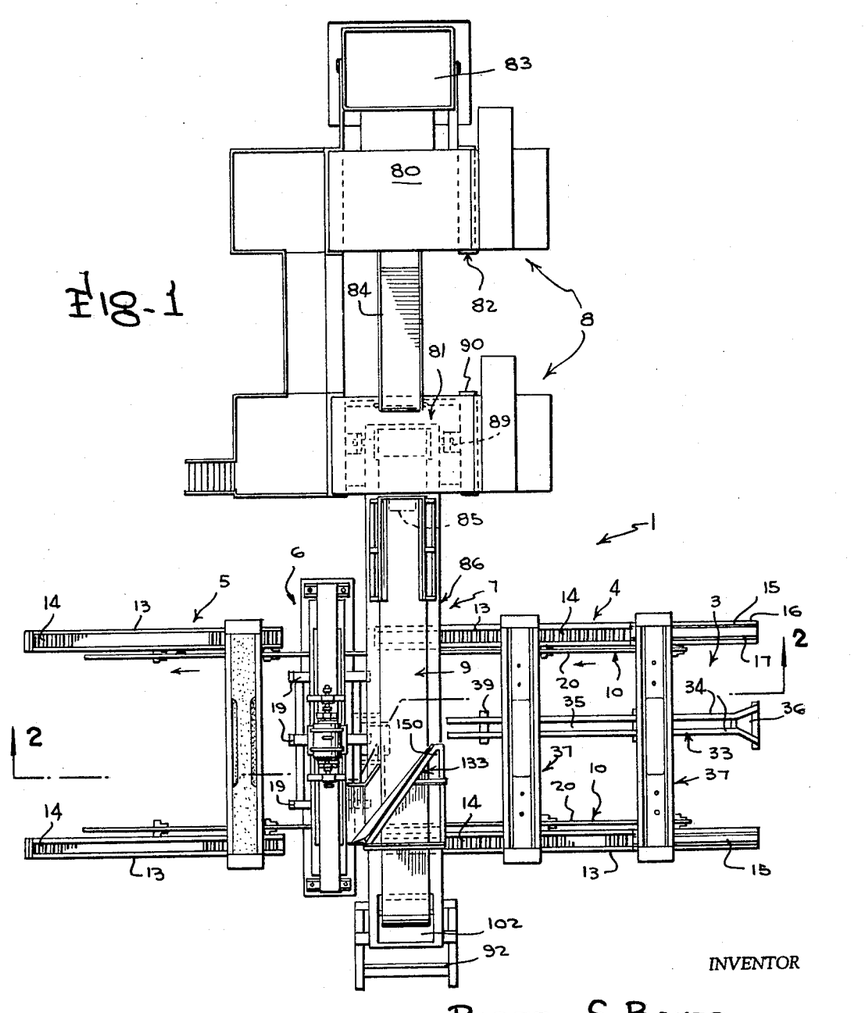
FIGURE 1 is a top plan view of the improved apparatus for molding concrete members.
Figure 2:
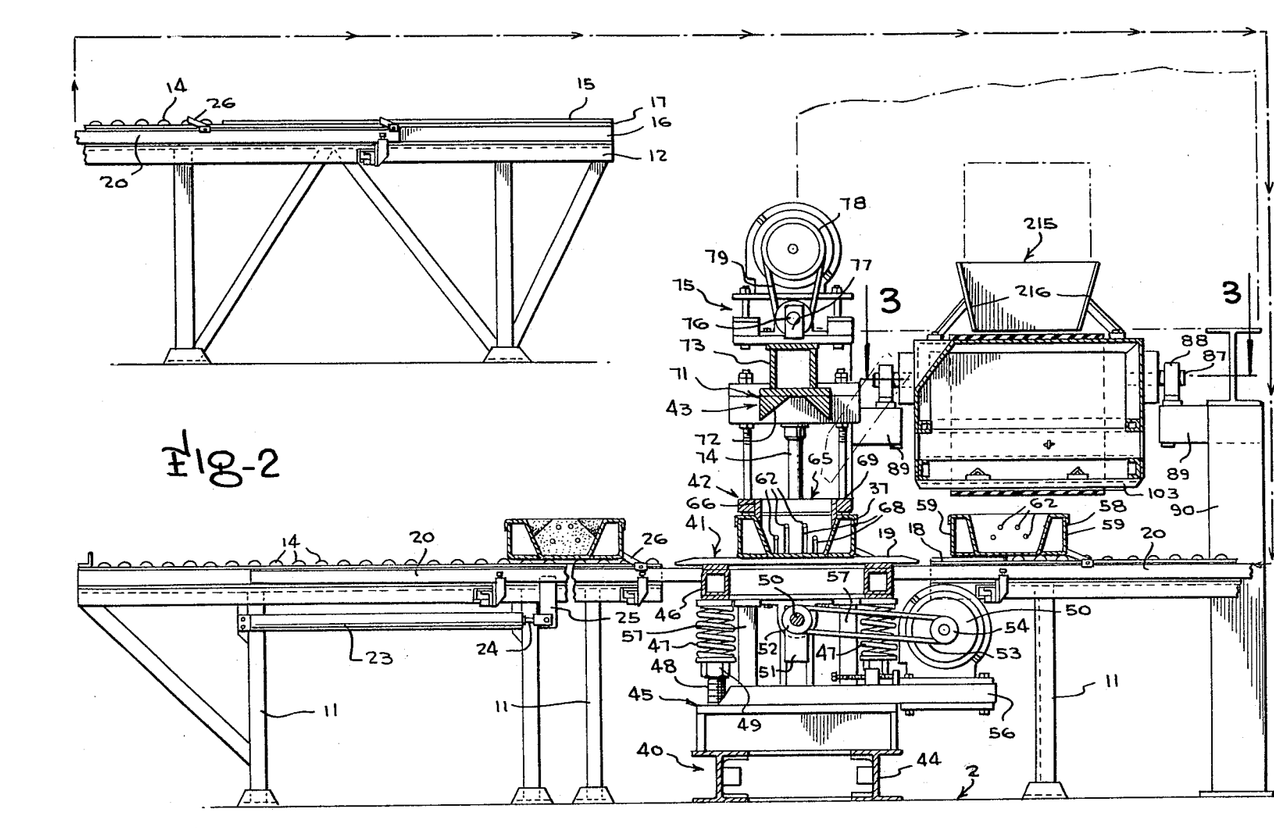
FIGURE 2 is a vertical section taken longitudinally of the pallet path substantially on the line 2—2 of FIGURE 1, with the pallet loading section of the pallet path being displaced from its normal position in order to show the mechanism on an enlarged scale.
Figure 3:
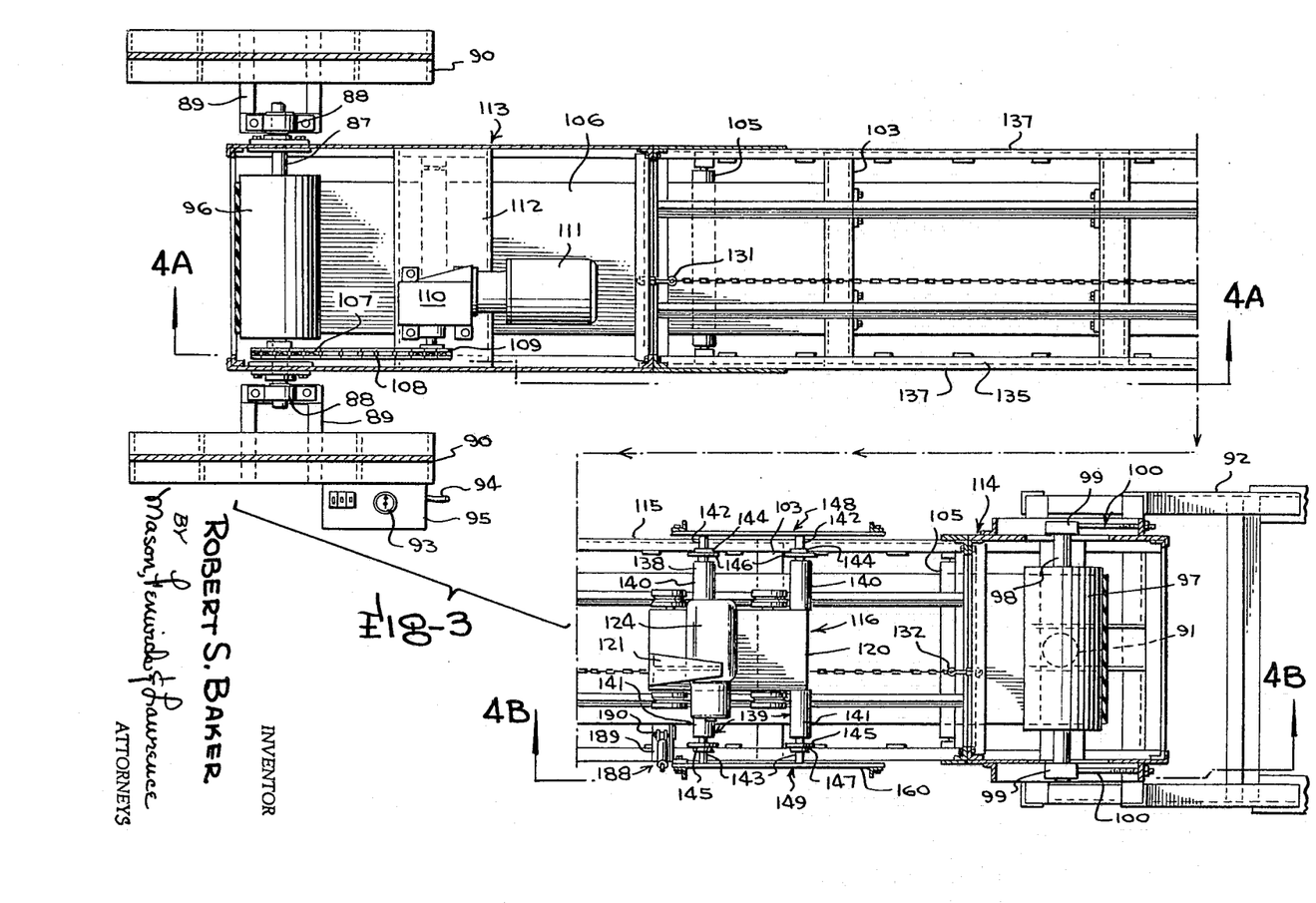
FIGURE 3 is a horizontal section taken through the pallet charging unit.
Figure 4:
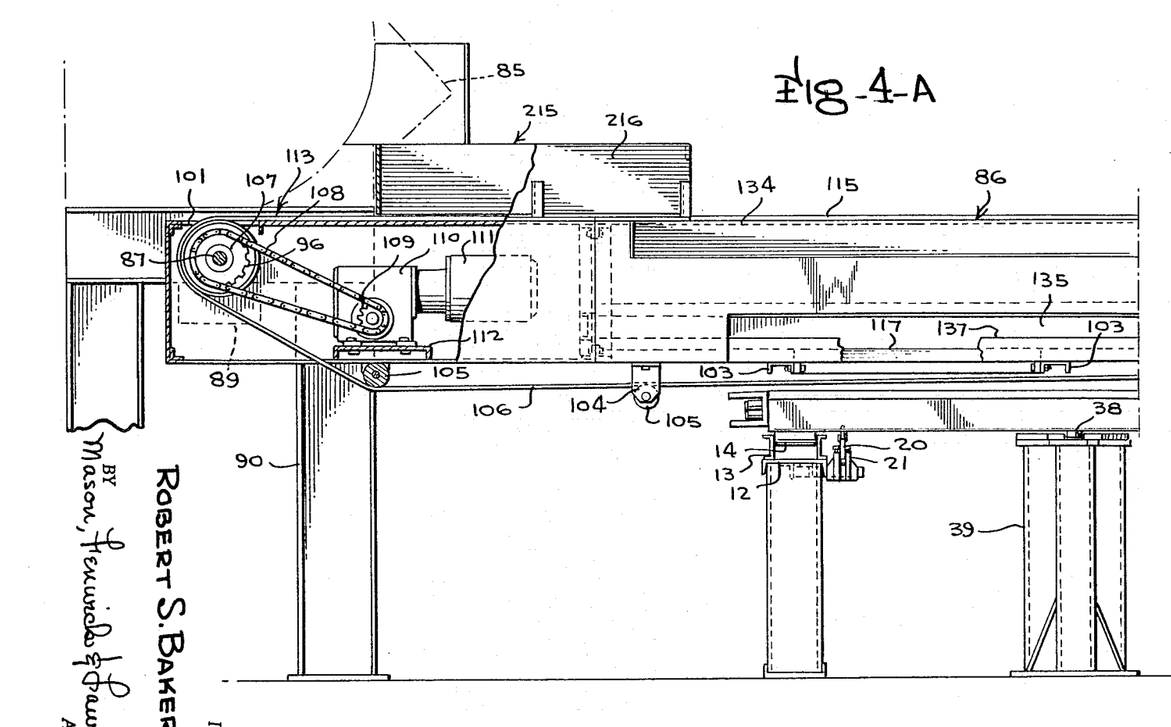
FIGURE 4A is a partial vertical section and partial side elevation taken on the line 4A—4A of FIGURE 3.
FIGURE 4B is a similar view taken on the line 4B—4B of FIGURE 3.
Figure 4B:
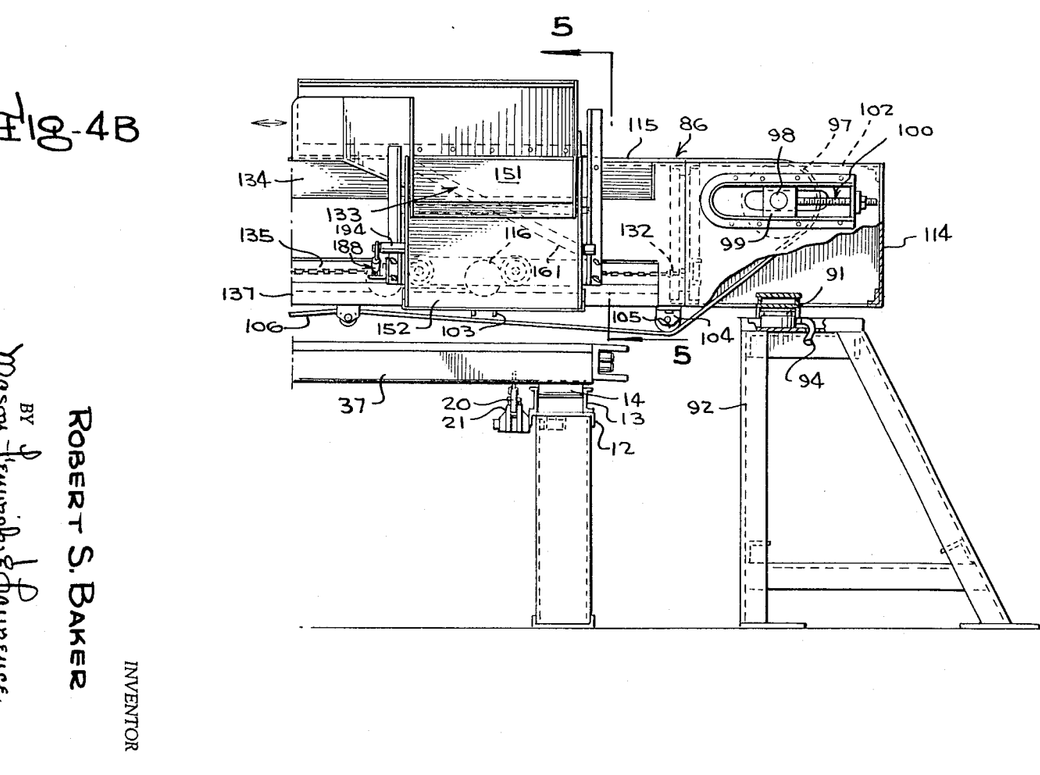
Figure 5:
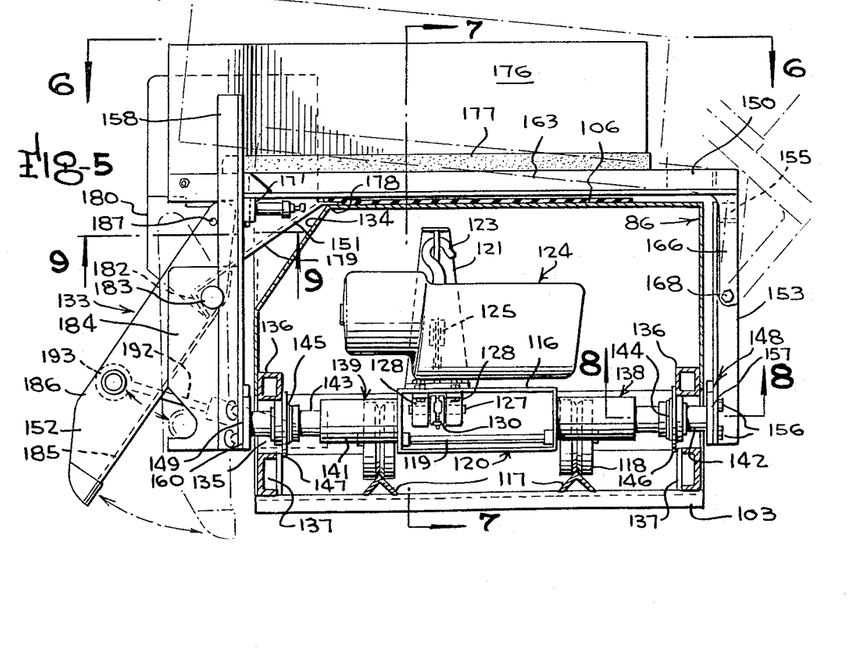
FIGURE 5 is a vertical transverse section through the charging mechanism taken on the line 5—5 of FIGURE 4B.
Figure 6:
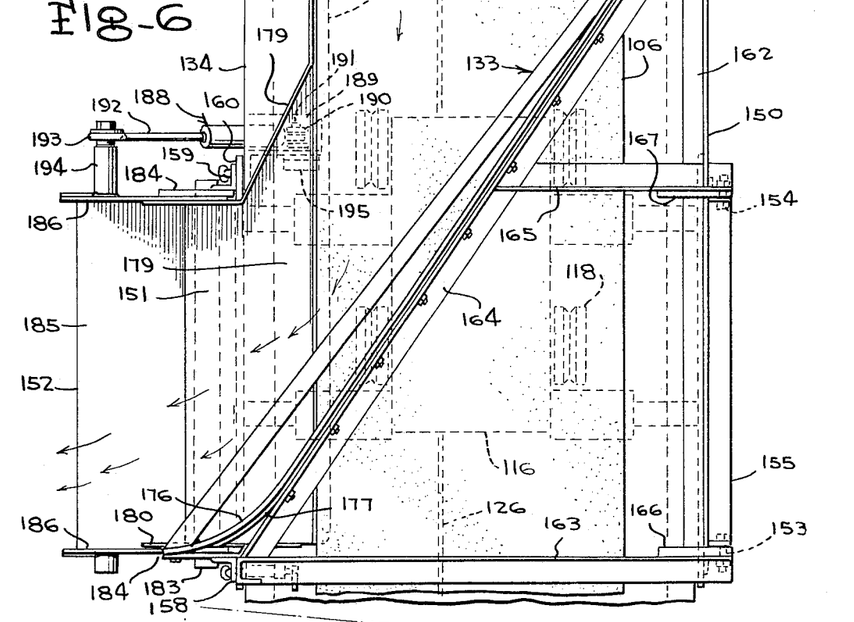
FIGURE 6 is a top plan view of the apparatus shown in FIGURE 5.
Figure 7:
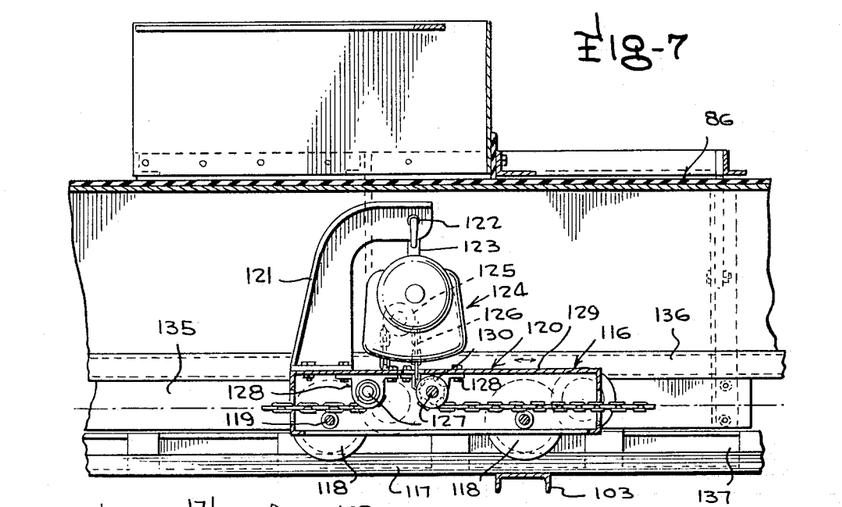
FIGURE 7 is a vertical section through the charging apparatus housing taken on the line 7—7 of FIGURE 5.
Figure 8:
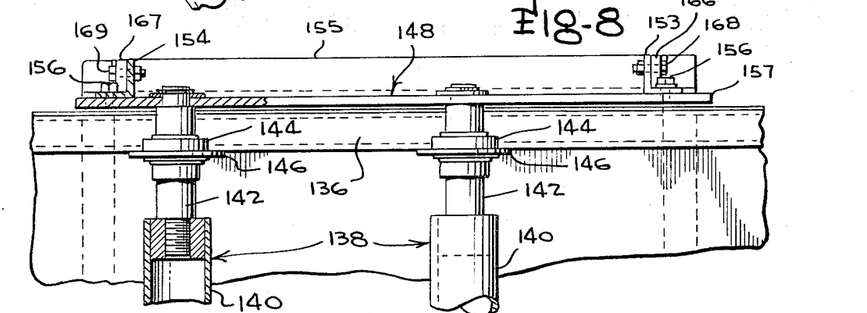
FIGURE 8 is a detail section showing the carrier outrigger construction taken on the line 8—8 of FIGURE 5.
Figure 9:
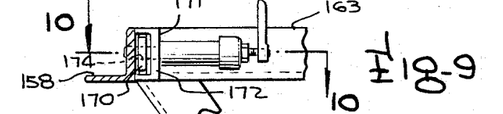
FIGURE 9 is a detail of the latch arrangement for the deflector frame.
Figure 10:
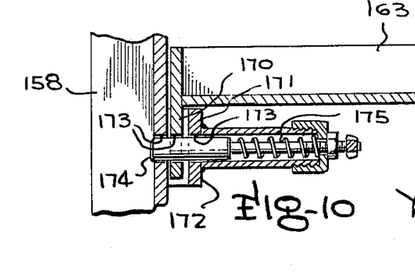
FIGURE 10 is a section taken on the line 10—10 of FIGURE 9.
Figure 11:
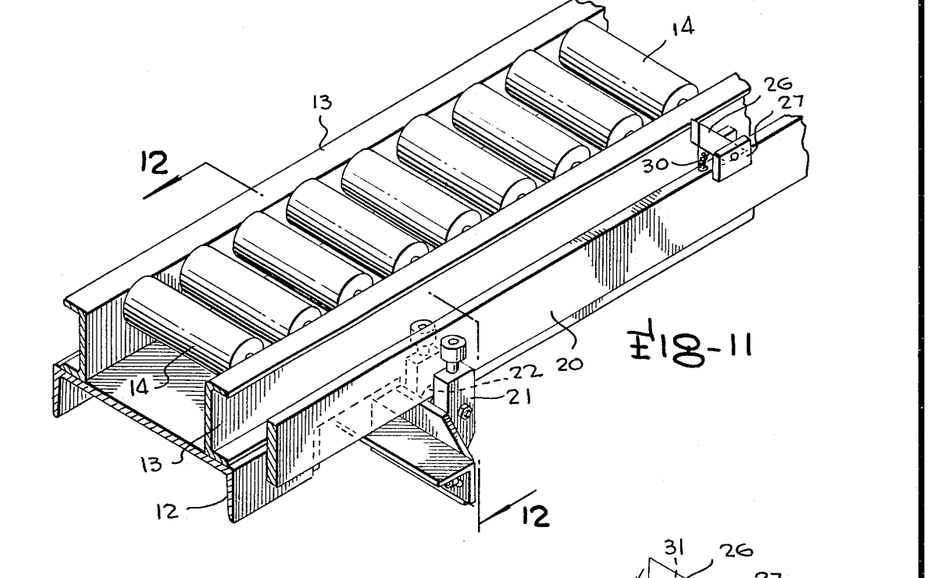
FIGURE 11 is a perspective view of a portion of the pallet supporting and advancing mechanism.
Figures 12, 13:
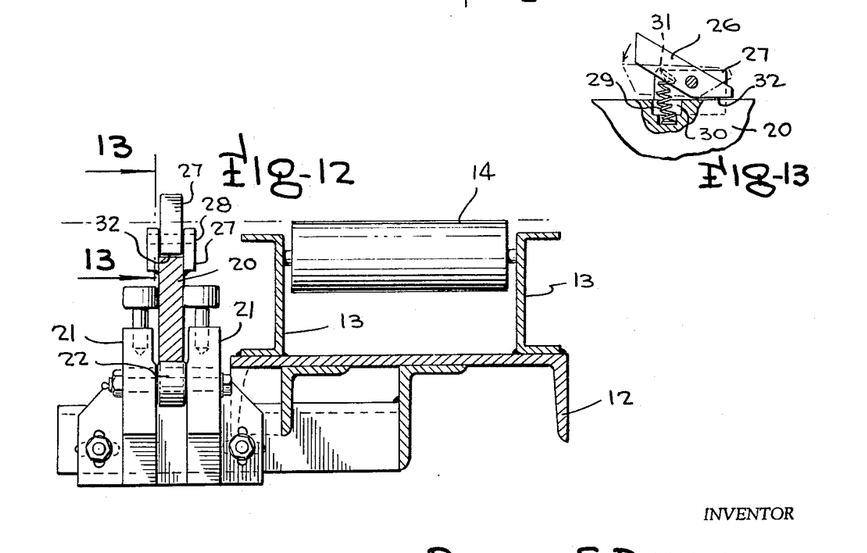
FIGURE 12 is a vertical section taken on the line 12—12 of FIGURE 11.
FIGURE 13 is a detail of one of the pallet advancing dogs taken on the line 13—13 of FIGURE 12.
Figures 14, 15:
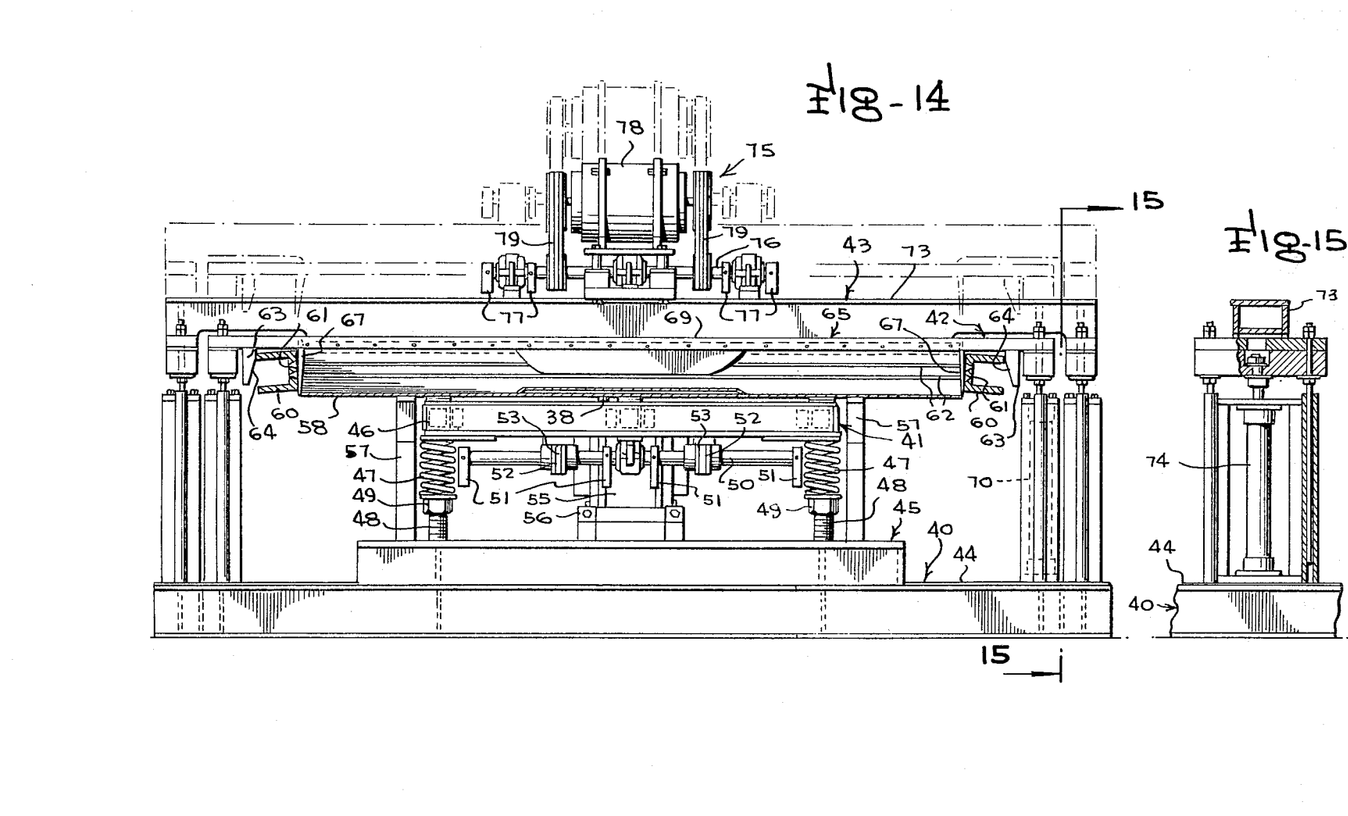
FIGURE 14 is a vertical section taken transversely of the pallet path illustrating the mechanism at the molding station.
FIGURE 15 is a section taken on the line 15—15 of FIGURE 14.

Referring to the drawings in detail, and particularly FIGURES 1 and 2, the molding apparatus 1 will be mounted on a suitable bed, or base, such as the concrete slab 2. The apparatus includes means to form a pallet path 3 having an empty pallet loading section 4 and a filled pallet removal section 5. Intermediate the two sections of the pallet path, and traversing the path, is a molding station 6. Immediately before the molding station, in the direction of pallet travel, and above the exit end of the loading section of the pallet path, there is a concrete handling mechanism 7 which consists of a two-stage aggregate mixing apparatus 8 and a pallet-charging unit 9.

The pallet path-forming means (see FIGURES 1, 2, 4A, 4B, 11, 12 and 13) is very similar to that disclosed in the above referred to co-pending application. Both the tie loading and tie removal sections have a pair of spaced parallel conveyors 10 which are supported upon suitable frames 11. At the tops of the frames there are inverted channels 12 which form beds upon which the conveyors 10 are mounted. The conveyors consist of spaced longitudinally extending rails 13, between which a plurality of conveyor rollers 14 are mounted. The receiving end of the tie loading section has no rollers, but flat skid plates 15 are mounted on top of a boxing formed by channel members 16 and a top plate 17. This provides a flat receiving surface upon which the pallets can be placed and properly aligned for movement along the conveyor path. A somewhat similar arrangement is provided at the delivery end of the tie loading section where the conveyor rollers are eliminated and a pallet supporting plate 18 replaces them.

The delivery end of the tie loading section of the pallet path is closely adjacent one edge of a vibrator table wear plate 19 forming part of the molding station. The receiving end of the tie removal section of the path is closely adjacent the opposite edge of the wear plate 19. Thus, the tie loading section, the wear plate and the tie removal section form a continuous supporting means for pallets as they are advanced along the pallet path.

Pallets are moved along the path of means of draw bars 20, which extend substantially the full length of the pallet path so as to be operative to draw the pallets in step-by-step motion throughout the entire pallet path. There is one draw bar for each of the conveyors, and the draw bars are located on the confronting sides of the conveyors. Each draw bar is slidably mounted in a plurality of guides 21, mounted on the channels 12 and projecting from the bases of the conveyors 10 of both the pallet loading and pallet removal sections. The guides each carry a roller 22 upon which the lower edge of the draw bar rides. The guides are fully adjustable to permit proper alignment of the draw bars throughout their length. The draw bars are given reciprocal movement by means of hydraulic cylinder assemblies 23 mounted on the frames 11 supporting the two conveyors of the tie removal sections 5 of the pallet path. There are two cylinders, one for each draw bar, and each cylinder has its piston rod 24 connected to its respective draw bar by means of a downwardly projecting arm 25 which is rigidly connected to the draw bar.

Spaced along the tops of the draw bars are a plurality of pallet engaging dogs 26. At each of the dog positions the draw bar is provided with upstanding ears 27 between which the dogs are mounted on pivot pins 28. The dogs are yieldingly urged to a raised pallet-engaging position by means of springs 29 which have one end seated in a socket 30 in the upper face of the draw bar and the opposite end seated in a socket 31 on the underside of the dog 26. One end of the dog is inclined as at 32 to strike the upper face of the draw bar and provide a limit stop for the dog to hold it in pallet-engaging position. It will be apparent that when the draw bars are moved in pallet-advancing direction by means of the cylinders 23, the pallets will be caused to move along the conveyors one step of movement. When the draw bars are moved in the opposite direction, the dogs will be depressed as they move under the pallets and will automatically rise to engage the next pallet which they are to advance.

Intermediate the conveyors of the tie loading section of the pallet path, there is a pallet-positioning sword 33. This is in the form of a guide having a pair of spaced members 34 defining between them a guide passage 35. The members 34 diverge at their entrance ends so as to form a converging throat 36 leading to the guide passage 35. The pallets 37 which are to be used with the apparatus are provided with a downwardly projecting stud 38 which will enter the throat 36 as the pallet is moved onto the end of the skid plates 15 and be guided by the converging throat 36 into the guide passage 35. This will accurately position the pallets transversely of the pallet path. The engagement of the pallets by the dogs of the two draw bars adjacent the opposite ends of the pallet will assure proper orientation of the pallet relative to the pallet path. The members 34 defining the guide passage are mounted at the top of any suitable supporting frame 39.

The molding station 6 (see FIGURES 1, 2, 14 and 15) in all major respects is similar to the molding station disclosed in the above mentioned co-pending application. It is arranged across the pallet path and includes a base 40 on which is mounted a vibrator table 41. The base also supports a mold box 42 and a stripper head 43. The base 40 is rectangular in shape and composed of a plurality of I-beams 44. The entire base is rigidly secured to the slab 2 on which the machine is mounted. The vibrator table 41 has a base portion 45 fixed to the top of the main base 40 of the molding station. The table proper shown at 46 is supported upon heavy coil springs 47 which encircle mounting legs 48 which are fixed to the base portion 45. The legs are threaded and carry spring seats 49 to permit adjustment of the springs to determine their compressive thrust. A vibrator shaft 50 is supported from the underside of the table 46 and carries a plurality of eccentric weights 51.

Shaft 50 carries a pulley 52 and is driven by a belt 53 from a pulley 54 on motor 55 mounted on a projection 56 at the rear of the base portion 45 of the vibrating table. Table 46 carries the wear plate 19 which, in fact, is composed of a series of narrow plates mounted at the sides and center of the vibrator table.

At each side of the base portion 45 there is a fixed abutment 57. The tops of these abutments are slightly below the top surface of the wear plates when the vibrator shaft is not in operation. Thus, when the pallet 37 is in position on the wear plates, the bottom of the pallet will be slightly above the tops of the abutments. However, when the vibrator shaft is in operation, the cycle of vibration will raise the wear plate and lower it and in its lowest position it will be below the tops of the fixed abutments. Therefore at each cycle of vibration the pallet will be lifted and dropped onto the fixed abutment. This jarring action is very effective in settling and compacting the concrete within the pallet.

The pallet 37 which is to be used with the present molding apparatus consists of a generally channel-shaped body member 58 having box type girder sides 59. These sides must be sufficiently strong to take the strain imposed by stressed cables when the pallet is in use. At each end of the channel-shaped body member there is a header 60. The headers are also channel shaped and each bridges the ends of the body member and are secured to the girder sides 59. Each header is drilled in a desired pattern to provide a series of holes 61 to receive stressing cables 62. It will be noted that the headers incline slightly so that the headers diverge from the bottom of the body member. The pallet may have any desired configuration to produce a concrete article of predetermined shape.

When the pallet as just described is moved by the draw bars 20 onto the several sections of the wear plate 19 of the vibrator table, it is in approximately the proper position for molding, even though it has left the guiding influence of the sword. However, to insure its proper position, the mold box 42 carries a pair of positioning guides 63 to engage the headers of the pallet and shift it laterally to its proper position in the event that it is not precisely aligned. These guides have inclined faces 64 to serve as cams in shifting the pallet position.

The mold box proper 65 is of rectangular shape, having tapered side walls 66 and tapered end walls 67. The side walls may not extend completely to the bottom of the pallet but this will depend upon the shape of the pallet and the object to be molded. The end walls will extend to the bottom of the pallet so as to properly form the ends of the molded member and, at the same time, provide a clearance space between the header and the ends of the molded object so that access can be had to the cables for cutting after the molded member is cured. When the mold box is used in forming a prestressed member, the end walls will be provided with suitable openings 68 to permit passage over the cables 62 in the pallet. The mold box proper is carried by a frame 69 which also carries the positioning guides 63. The frame projects beyond the mold box at the ends, and each end is mounted upon suitable hydraulic cylinder assemblies 70 fixed upon the base 40 and capable of lowering the mold box into a properly oriented pallet and lifting it therefrom.

Overlying the mold box is the stripper head 43. This unit has a central portion 71 designed to fit within the mold box, and its undersurface 72 is contoured to form a predetermined shape on the upper surface of the molded member. The element 71 is the stripper proper and it is carried by a frame 73 which is also supported by cylinder assemblies 74 mounted upon the base 40. This mounting will allow the stripper head to be lowered into the mold box which is in place within the pallet and exert a compressive force upon the concrete in the mold box. The compressing action of the stripper head is augmented by a vibrating mechanism 75 carried above the stripper head on the frame 73. This mechanism includes a shaft 76, carrying eccentric weights 77 and driven by a motor 78 by means of belts 79.

When a pallet is moved into position at the mold station, cylinders 71 are operated to lower the mold box into the pallet. At the same time this occurs, the pallet is shifted laterally, if necessary, by means of the guides 63. With the assembly in this position, concrete is poured into the mold box to the desired depth and the vibrator mechanism of the vibrating table is put into operation to settle the concrete in the mold box. Cylinders 74 are then operated to bring the stripper head down into the mold box into contact with the concrete, and the vibrator mechanism 75 is started to complete the vibrating and compressing action necessary to create the desired density in the molded member. When the vibrating cycle is completed, the vibrators are stopped, the stripper head is raised and the mold box is then lifted from the pallet. The pallet with the molded member in place can then be advanced by the draw bars from the molding station onto the removal section of the pallet path.

Concrete is supplied to the mold box by the concrete handling mechanism 7. (See FIGURES 1 to 10, inclusive.) The mixing apparatus of this assembly is a conventional mixing unit, and consists of a primary mixer 80 and a secondary mixer 81 mounted upon a frame 82 which elevates the mixers a considerable distance above the molding station. Aggregate is supplied to the primary mixer by means of a skip hoist 83 and the preliminarily mixed material passes from the primary mixer 80 onto a conveyor 84 which carries the mixed material to the secondary mixer 81. The concrete, in properly mixed condition, is discharged from the secondary mixer through a discharge door 85. All of these units are standard and their detailed construction forms no part of the present invention.

The pallet charging unit 9 extends from a point beneath the secondary mixer 81 completely across the pallet path parallel to the molding station. This unit is mounted on, and within, an elongated housing 86. A shaft 87 extends through the housing horizontally adjacent the end beneath the secondary mixer and is pivotally mounted in bearings 88, which bearings are mounted on short I-beams 89 projecting inwardly from supporting frames 90. The frames 90 also serve as supports for the mixing apparatus. The opposite end of housing 86 rests upon a compression type load cell 91 which is mounted upon the top of a support frame 92. This mounting of the housing 86 causes the weight of the outer end of the housing to be imposed upon the load cell, so that the housing serves as a weighing arm, and the weight will be registered by the cell. A convenient dial 93 connected by a hose 94 with the load cell can be located adjacent the operating panel 95 of the machine so that the operator may conveniently read the dial.

An elongated belt pulley 96 is mounted on shaft 87 inside the housing 86. A similar pulley 97 is mounted on a shaft 98 journaled in bearings 99 mounted in conventional belt tightening devices 100 fixed to the end of the housing overlying the load pressure cell. The top of the housing is provided with an opening 101 overlying the pulley 96 and a second opening 102 overlying the pulley 97. The housing is open at the bottom with the sides being held in spaced relation by means of a plurality of bracing channels 103. At spaced points along the sides of the housing ears 104 project downwardly to journal a plurality of idler rollers 105. The pulleys 96 and 97 have their peripheries tangent to the plane of the top surface of the housing, and a conveyor belt 106 is passed around the pulley 96, out through opening 101 and across the top of the housing, then through opening 102 and around pulley 97, and over the idler rollers 105 back to the pulley 96. Belt 106 is used to convey mixed concrete deposited from the secondary mixer 81 across the top of housing 86.

Shaft 87 which carries pulley 96 has a sprocket 107 fixed on it, and this sprocket is driven by chain 108 from a sprocket 109 on a speed reducer 110 driven by a motor 111. The motor and speed reducer are mounted upon a platform 112 within the housing.

The housing is divided into three sections. A first section 113 is an end section, housing the pulley 96, the motor and the speed reducer. The second section 114 is also an end section and houses the pulley 97. The third section 115 is a central section, and it forms a compartment along which a carrier 116 travels to provide the moving force for discharging concrete from the belt 106, as will be described.

Housing section 115 has tracks 117 extending its full length and mounted on the bracing channels 103. The carrier is in the form of a cart mounted upon grooved wheels 118 adapted to ride along the tracks 117. The wheels are on axles 119 supported in the cart body 120. There is a pedestal 121 fixed to the top of the body at one end and projecting upwardly and inwardly, with its free end overhanging the intermediate portion of the cart. The pedestal is provided with an opening 122 to receive the mounting hook 123 of a chain hoist 124. The chain hoist is of conventional design having a power sheave 125 over which a standard link chain 126 passes. There are two shafts 127 mounted in pillow blocks 128 fixed to the underside of a platform 129 on the body of the cart. Each shaft 127 carries a load sheave 130 having recessed peripheries to receive the alternate links of chain 126 and serve as direction changers for the chain. The ends of the chain are anchored in I-bolts 131, at the end of the housing section 115 adjacent the section 113, and 132, at the end of housing 115 adjacent section 114. It will be evident that when the hoist is operated it will rotate its driving sheave and cause the load sheaves 130 to move along the chain and thus propel the carrier along the tracks 117.

The housing section 115 is arranged so that carrier 116 can support, and move, a deflector, skid and chute assembly 133 along the belt 106 to scrape off concrete accumulated on the belt and discharge it into the mold box. To this end, the housing has a portion of one upper edge flattened to provide an incline 134. Each side of the housing is slotted, as at 135, almost the entire length of the housing, and upper and lower tubes 136 and 137 extend, respectively, along the upper and lower edges of the slots on the inner sides of the side walls. These tubes strengthen the housing side walls in the region of the slots, and the upper tubes 136 form stabilizing bearing rails for outriggers 138 and 139 extending from the carrier. The outriggers have tubular ends 140 and 141 which are welded to opposite sides of the carrier body 120 to project horizontally outward. The tubular members carry shafts 142 and 143, which are coaxial to the tubular members and project through the slots 135 in the housing. Rollers 144 and 145 are mounted on the shafts for rolling bearing against the undersides of tubular rails 136, and the rollers have flanges 146 and 147 which contact the inner sides of tubes 136 and prevent lateral shifting of the carrier. Thus, the carrier is prevented from vertical movement and lateral tilting by the opposed bearing of wheels 118 and rollers 144 and 145, and from lateral movement by roller flanges 146 and 147. This provides an extremely stable carrier, to enable it to support and move the deflector, skid and chute assembly 133 under the heavy loads imposed during discharge of concrete.

Assembly 133 includes a rear frame 148, fixed to the outriggers 138, a front frame 149, carried by the outriggers 139, and a deflector frame 150, pivotally connected to the rear frame 148 and latchable to the front frame 149. Front frame 149 also carries the skid 151 and chute 152.

Rear frame 148 has a pair of spaced, parallel side angle members 153 and 154 which are held in spaced relation at the top by a bridge 155. The bottom ends of angle members 153 and 154 are attached by bolts 156 to a mounting bar 157 which is connected to the outer projecting ends of the shafts 142 of outriggers 138, outside the housing 115. This mounting positions the rear frame parallel to, and spaced slightly from, the side wall of housing 115, and mounted rigidly on the carrier for movement with it.

The front frame 149 is quite similar to the rear frame, having vertical angle members 158 and 159 secured at their bottoms to cross bar 160 carried by shafts 143 of outriggers 139. The angle members are connected near their tops by bridge 161.

Deflector frame 150 is triangular in top plan, consisting principally of a back angle member 162, a side angle member 163 at right angles to the member 162 and spanning the top of the housing between the vertical members 153 and 154 of the rear frame 148 and 158 and 159 of the front frame, and an inclined angle member 164 connecting the outer ends of the members 162 and 163. A cross member 165 bridges the members 162 and 164 parallel to the side member 163 and spaced from the member 163 a distance approximately the spacing of the vertical members 153 and 154 of the back frame. The members 163 and 165 carry right angular hinge straps 166 and 167 which are pivotally connected to the vertical members 153 and 154 of the back frame by pivot bolts 168 and 169. By this arrangement, the deflector frame can be swung upwardly and rearwardly to an inoperative position at the back of the housing, as shown in dotted lines in FIGURE 5, or to an operative position overlying the belt 106. The front end of the side member 163, that is the end to which the inclined member 164 attaches, is provided with a downwardly, projecting tongue 170 for insertion into a pocket 171, formed between the top end of the adjacent vertical member 158 of the front frame 149 and a strap 172 fastened to the vertical member. The vertical member, tongue and strap are all apertured, as at 173, to receive the bolt 174 of a spring biased latch 175 carried by the strap 172 and projecting rearwardly therefrom. This permits locking the deflector frame in place across the belt for operation, and releasing and swinging the frame to the back of the housing for cleaning, as will be described.

The inclined member 164 serves as a mounting for a deflector 176. The deflector extends from the back edge of belt 106 across the belt and beyond the housing front edge and carries a flexible scraper 177 along its bottom edge for sliding movement over the belt.

The skid 151 is carried by the front frame 149 of the assembly and provides a tapering throat into which concrete scraped from the belt by the deflector will fall. The skid has a flat skid plate 178 which rides on the top surface of the housing and underlies the adjacent edge of the belt 106 to form a moving ledge leading to an inclined section 179. Appropriate sides 180 and 181 confine concrete to the throat. The bottom of the skid has a reversely bent flange 182 to cover a hinge bolt 183 mounting the concrete chute 152. The hinge bolt has its ends secured in mounting plates 184 fixed to the vertical members 158 and 159 of the front frame 149. The chute is trough-shaped, having a floor 185 and sides 186. Stops 187 on the upper sides of the chute strike the front frame vertical members to limit outward inclination of the chute.

The chute is moved to and from its outwardly inclined operative position by means of a fluid cylinder assembly 188 pivotally attached to a bracket 189 fixed to the front frame by the bolts that attach the frame to the mounting bar 160. The bracket has upstanding ears 190 to which the cylinder is connected by bolt 191. The piston rod 192 of the cylinder assembly terminates in a loop 193 fitted over a stud 194 projecting from the side of the chute. A suitable solenoid valve 195 for controlling flow of fluid to the cylinder can also be carried by the bracket 189.

Figure 16:
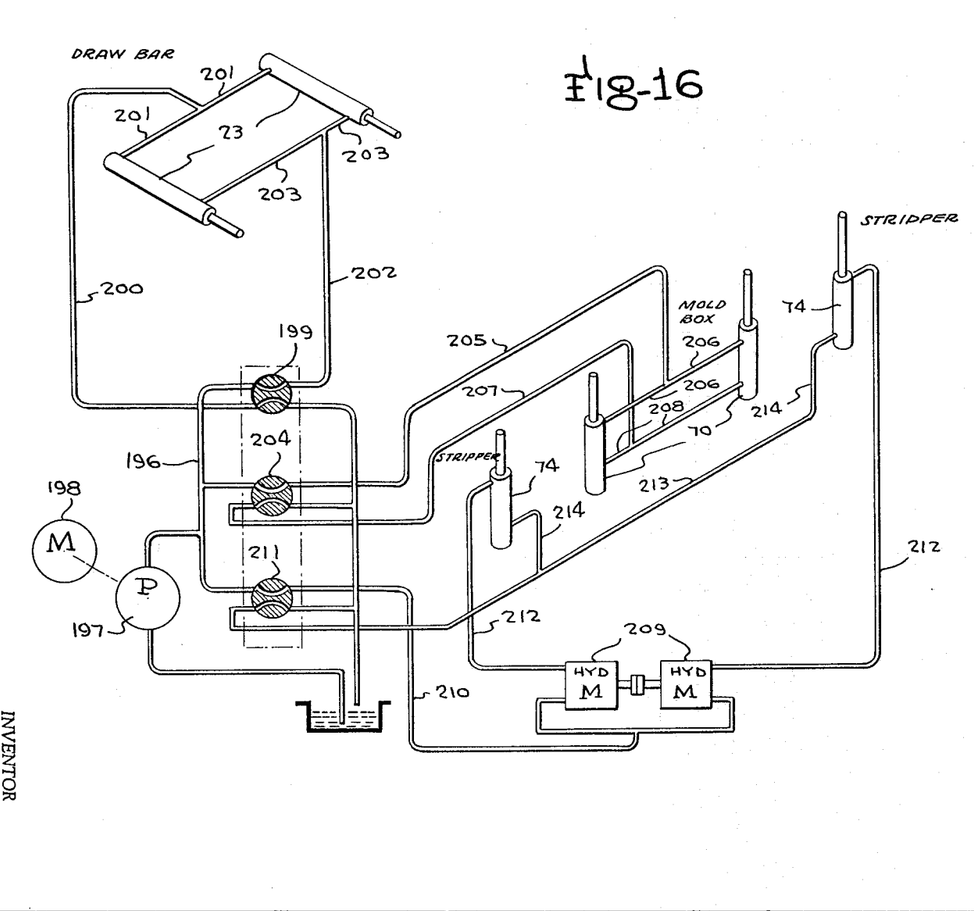
FIGURE 16 is a diagrammatic view of the hydraulic system for operating the various parts of the apparatus.

FIGURE 16 shows a schematic layout of a hydraulic system suitable for operating the apparatus. In this drawing, the drawbar operating cylinders 23, the mold box cylinders 70 and the stripper head cylinders 74 are shown diagrammatically. All of these cylinders are connected by valve-controlled fluid lines with a pump manifold 196 coupled to a pump 197 driven by a motor 198. The pump is connected to any suitable source of fluid and maintains fluid under operating pressure in the manifold 196.

When it is desired to advance pallets along the path 3, a manual valve 199 is operated to open a line 200 from manifold 196, which line branches into two lines 201 that lead to the bottom ports of the drawbar cylinders 23. This will extend the piston rods to impart a retractive movement to the drawbars to cause the dogs 26 on the drawbars to move back under the next succeeding pallets on the path. By closing line 200 and opening a line 202, which branches to lines 203 to the top ports of cylinders 23, the drawbars will be retracted and the pallets advanced one step of movement along the path.

The mold box is lowered by opening a valve 204 in a line 205 which divides into lines 206 to the top ports of the mold box cylinders 70. Power to the tops of the cylinders will draw the mold box down into seating relation with a pallet at the mold position. When line 205 is closed a line 207 is opened and fluid will flow through line 207 and branch lines 208 to the bottom ports of cylinders 70 and the mold box will be lifted to its inoperative position.

The stripper head 43 not only has to raise and lower, but it must also exert a compressive force upon the concrete in the pallet and mold box to form the tie. It must also move into the mold box parallel to the bottom of the pallet to complete a proper tie. It cannot have one end canted due to increased resistance on one side. To this end, intercoupled hydraulic motors 209 are arranged in a line 210 connected to the manifold 196 and controlled by a valve 211. The output from motors 210 is taken by lines 212 to the top of cylinders 74. Metered flow from motors 210 will assure level movement of the stripper head and a horizontal top surface on concrete members being molded. As level control is not necessary in lifting the stripper head, a line 213 from valve 211 branches into lines 214 going directly to the bottom of cylinders 74.

In operating the device, pallets will be prepared for use at some point away from the machine. If prestressed articles are to be formed, the stressing cables will be strung along the pallets and through anchors in the headers. The cables can be stressed individually with hydraulic jacks.

Prepared pallets will be placed on the skid plates 15 at the entrance end of the pallet-loading section of the pallet path. The mixing apparatus 8 will be set into operation, and aggregate supplied to it by the skip hoist 83. When the concrete in the mixers reaches the proper consistency the machine is ready for operation.

Moving valve 199 to put line 200 in communication with manifold 196 will cause the drawbar cylinder 23 to extend, moving the outermost dogs 26 beneath the adjacent pallet on skid plates 15 to engage the back of the pallet. At this time, stud 38 on the pallet will be in the guide passage 35 of the sword 33 and aligned transversely of the pallet. The engagement of dogs 36 near opposite ends of the pallet will orient the pallet at right angles to the pallet path. If valve 199 is moved to couple line 202 to the manifold, the cylinders 23 will be retracted and the pallet drawn forward one step of movement. The drawbars will be operated until the leading pallet has been moved step-by-step to its position at the molding station. During the last part of this movement, the pallet is no longer under the influence of the sword, but its position relative to the path has already been established and there will be slight movement from this position.

When the pallet arrives at the molding station, it will be seated upon the wear plate 19 of the vibrator table. Operation of valve 204 to put line 205 in communication with cylinders 70 will cause the mold box 42 to lower into position on the pallet. As the mold box comes down, positioning guides 63 will enter the pallet and their inclined faces 64 will shift the pallet lengthwise, if necessary, to precisely align the pallet with the mold box. The mold box then seats in the pallet.

At this point in the procedure, motor 111 in the housing 86 of the concrete handling mechanism is started and belt 106 begins to move. The upper flight of the belt moves along the top of the housing from the mixers toward the housing outer end overlying load cell 91. At this time, carrier 116 together with the deflector skid and chute are also at their limit of travel outwardly of the housing. Mixer discharge door 85 will be opened, and concrete will pour into a hopper 215 overlying belt 106 beneath the mixer discharge door. The hopper has upstanding inclined side walls 216 which will confine concrete falling from door 85 to the belt 106. The rate of discharge of concrete from the mixer and the speed of belt 106 will be calibrated to deposit a layer of concrete of predetermined amount on the belt as the belt moves through the hopper area. The amount of concrete accumulated on the belt by the time the first approaches the deflector position will provide indication on the load cell dial that the proper weight has been accumulated.

When the load cell dial shows a predetermined load figure, the chain hoist drive 124 of carrier 116 is started to cause the carrier to begin to move toward the mixer end of housing 86. The belt 106 can be stopped and the accumulated concrete on the belt swept off by the deflector during the travel of the carrier, or, if larger quantities of concrete are desired in the mold box, the carrier travel can be gauged to the belt movement to obtain a uniform deposit in the mold box.

In either operation, the chute 152 will be moved to its outer position by operating valve 195, in which position the outer end of the chute overlies the mold box. As the carrier moves slowly along its tracks 117, deflector 176 will sweep the belt, causing the accumulated concrete to flow over the skid plate 178, down chute 152 into the mold box. As the layer of accumulated concrete on the belt will be uniform, the deposit of concrete in the mold box will be uniform. By the time the carrier reaches its inner limit of movement, there will be a predetermined quantity of concrete uniformly distributed within the mold box.

In order to get a preliminary settling of the concrete in the mold box, vibrator table 41 is set in motion by starting vibrator motor 55. During this period, the carrier may be run back to its outer, at rest, position and chute 152 retracted. The concrete settles quickly, and stripper head 43 is lowered by operation of valve 211 to come into pressure contact with the concrete in the mold box. While the stripper head remains under pressure, stripper vibrator mechanism 75 is started by operation of motor 78. The dual vibration of vibrator table and stripper head, with the stripper head pressure, produces an extremely dense and uniform product. After a short vibration cycle, the vibrators are cut off. The stripper head is first raised by operation of valve 211. Operation of valve 204 then lifts the mold box from the pallet leaving the cast member supported wholly on the pallet.

The pallet can now be moved from the molding station by operating the drawbars and an empty pallet will be moved into place at that station. The cast member on its pallet can be hand finished if required while on the pallet delivery section 5 of the pallet path, and loaded pallets can accumulate at the end of the pallet path for removal from the machine.

After casting operations are completed the machine is shut down and cleaned. Cleaning is required for the belt 106, the skid 151, chute 152 and deflector 176. The deflector frame 150 can be released by drawing back latch bolt 174 and freeing tongue 170 in pocket 171. The entire deflector frame can be swung back about pivot bolts 168 and 169 to a position at the back of housing 86. This leaves the entire exposed area of the housing top and the belt 106 free for cleaning. After cleaning, the deflector frame can be swung quickly back into place and latched to hold it against movement.

While in the above one practical embodiment of the invention has been disclosed, it will be understood that the specific construction shown is merely by way of illustration and the invention may take other forms within the scope of the appended claims.

What is claimed is:

1. Apparatus for forming concrete articles comprising, means forming a pallet path, means to advance pallets positioned across said path along the path step-by-step, means forming a molding station across the path and including a mold box movable vertically to and from seating relation with pallets moved along the path to the molding station, a support located to one side of and above and parallel to the mold box when in seating relation in a pallet, a conveyor belt having a flight movable along the top of the support the full length of the mold box, means to move the belt, means to supply mixed concrete to the said belt flight, a deflector movable over the said belt flight in sweeping relation thereto, and a chute movable with the deflector and positioned to receive concrete swept from the said belt flight by the deflector and discharge it into the mold box.

2. Apparatus for forming concrete articles as claimed in claim 1 wherein, there is a pivotal mounting for one end of the support, and there is a load registering device upon which the other end of the support rests, whereby the weight of mixed concrete on the said belt flight can be measured.

3. Apparatus for forming concrete articles as claimed in claim 1 wherein, there are tracks extending longitudinally interiorly of the support, a car mounted on the tracks and having means carrying the deflector and chute, the support having openings along the sides thereof and the means carrying the deflector and chute extending through the openings, and means to drive the car along the tracks.

4. Apparatus for forming concrete articles as claimed in claim 3 wherein, the chute is pivotally mounted on the means carrying the chute, and there is means to move the chute to and from concrete receiving position.

5. Apparatus for delivering mixed concrete into a mold box comprising, a support, a frame mounting the support to lie parallel to the mold box, the support being pivotally connected at one end to the frame, a load registering device on the frame upon which the other end of the support rests, an endless belt mounted on the support and having a concrete-receiving flight above the plane of the top of the mold box, a deflector movable over the concrete-receiving flight of the belt in sweeping relation thereto, and means to move the deflector along the said belt flight to sweep concrete therefrom into the mold box.

6. Apparatus for delivering concrete into a mold box as claimed in claim 5 wherein, the pivotal mounting of the support is at the end of the support from which the concrete supporting flight of the belt moves.

7. Apparatus for forming concrete articles comprising, a molding station having a mold box, and a concrete delivery mechanism adjacent the molding station including, a support, a pivotal mounting for one end of the support, a load registering device upon which the other end of the support rests, an endless belt having a concrete supporting flight parallel to and above the mold box, a deflector movable over the concrete supporting flight of the belt in sweeping relation thereto, and a chute movable with the deflector and positioned to receive concrete swept from the belt by the deflector and discharge it into the mold box.

References Cited by the Examiner

UNITED STATES PATENTS

| | | | |
|---|---|---|---|
| 1,728,928 | 9/1929 | Crowell | 25—2 |
| 2,099,071 | 11/1937 | Lundbye | 198—188 |
| 2,288,159 | 6/1942 | Ernst | 198—188 |
| 2,601,914 | 7/1952 | Davies | 198—31 |
| 2,696,330 | 12/1954 | Fahrini | 25—2 X |
| 2,968,082 | 1/1961 | Schutze et al. | 25—2 X |
| 3,060,540 | 10/1962 | Lapidus | 25—2 X |

WILLIAM J. STEPHENSON, *Primary Examiner.*

UNITED STATES PATENT OFFICE
CERTIFICATE OF CORRECTION

Patent No. 3,274,659　　　　　　　　　　　　September 27, 1966

Robert S. Baker

It is hereby certified that error appears in the above numbered patent requiring correction and that the said Letters Patent should read as corrected below.

In the heading to the printed specification, line 4, for "Robert S. Baker, P. O. Box 11615, Tampa, Fla." read -- Robert S. Baker, Tampa, Fla., assingor to Julian L. Cone, Jr., Charles W. Cone and Douglas P. Cone, all of Tampa, Fla. --.

Signed and sealed this 29th day of August 1967.

(SEAL)
Attest:

ERNEST W. SWIDER
Attesting Officer

EDWARD J. BRENNER
Commissioner of Patents